Wheat & Bunge,
Fruit Basket,
N° 57,024. Patented Aug. 7, 1866.

UNITED STATES PATENT OFFICE.

CORYDON WHEAT AND CHARLES BUNGE, OF GENEVA, NEW YORK.

IMPROVEMENT IN FRUIT-BASKETS.

Specification forming part of Letters Patent No. 57,024, dated August 7, 1866.

*To all whom it may concern:*

Be it known that we, CORYDON WHEAT and CHARLES BUNGE, of Geneva, in the county of Ontario and State of New York, have invented a new and useful Improvement in Fruit-Baskets or Merchandise-Boxes; and we do hereby declare that the following is a full, clear, and exact description of the construction and operation of the same, reference being had to the annexed drawings, making a part of this specification, in which—

Figure 1:
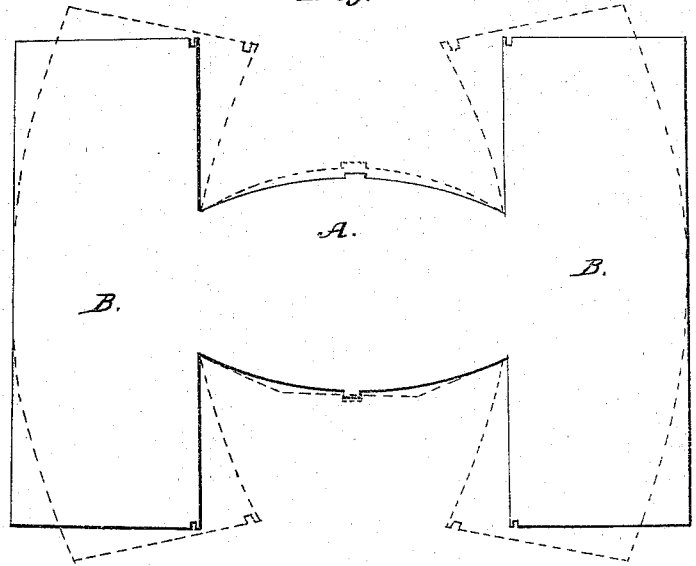
Figure 2:
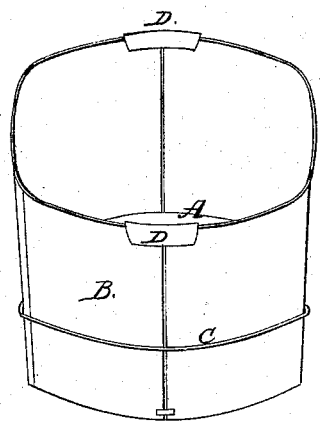

Figure 1 is a plan of the material as made for the basket or box. Fig. 2 is a perspective view of the basket as put up for use.

The letters of reference refer to the same parts in each figure.

A is that part of the material that constitutes the bottom of the box or basket. It may be made any size, shape, or form, and should be shaped to suit the shape of box required, for upon the shape of the bottom depends some the shape of the basket. The bottom and sides are made of the same piece of material, and are better made of some kind of soft tough wood, although any kind of material may be used that can be bent into the required shape, if it has sufficient strength to hold its contents while being conveyed to market.

B is one of the sides, made of the same material as the bottom, and is made connected to the bottom at its ends. They are made in shape as shown in Fig. 1. They and the bottom being cut into shape, as thus shown, are in the proper condition to be sold to the consumer or conveyed to the garden or other place where they may be used; but immediately before being used they should be moistened with water, so that they may be bent into shape without breaking. When it is to be filled or used the sides are first bent upward, where they unite with the bottom. Then they are bent around the bottom and into the shape represented in Fig. 2. At the lower corner of the sides are notches, made to fit projections that are formed upon the edge of the bottom A, as shown in Fig. 1. The use of these is to hold the sides in position while the basket or box is being shaped and filled.

When boxes of various shapes are required, the shape of the bottom must be made to suit the shape of the sides, varied, as represented by the dotted lines in Fig. 1, or any other shape required, as the shape will be varied to suit the use to which it may be applied.

C is a band made to surround and support the box, and it may be made of any desirable material, and applied as shown in Fig. 2.

D and D are clasps. They are made by bending sheet metal double, and in shape as shown in Fig. 2. Their use is to hold the upper corners of the sides together, as shown in the same figure.

When covers are required, they may be made in a similar manner, or may be made of thin material and the size and shape of the top of the box or basket, and placed within the top and secured in any convenient manner.

Having thus fully described our invention, what we claim as new, and desire to secure to secure by Letters Patent, is—

The band C and clasps D and D, when made and used for the purpose herein set forth, in combination with the body of the basket, when composed of one piece of stuff.

CORYDON WHEAT.
CHARLES BUNGE.

Witnesses:
W. P. DURRANT,
CHARLES KETCHUM.